US008059873B2

(12) United States Patent
De Bliek et al.

(10) Patent No.: US 8,059,873 B2
(45) Date of Patent: Nov. 15, 2011

(54) VOLUME OF INTEREST SELECTION

(75) Inventors: Hubrechte Lambertus Tjalling De Bliek, Eindhoven (NL); Frans Andreas Gerritsen, Eindhoven (NL)

(73) Assignee: Koninklijke Philips Electronics N V Eindhoven (NL)

( * ) Notice: Subject to any disclaimer, the term of this patent is extended or adjusted under 35 U.S.C. 154(b) by 1174 days.

(21) Appl. No.: 11/719,858

(22) PCT Filed: Nov. 16, 2005

(86) PCT No.: PCT/IB2005/053776
§ 371 (c)(1),
(2), (4) Date: May 22, 2007

(87) PCT Pub. No.: WO2006/085155
PCT Pub. Date: Aug. 17, 2006

(65) Prior Publication Data
US 2008/0123914 A1 May 29, 2008

(30) Foreign Application Priority Data

Nov. 26, 2004 (EP) .................................... 04106122
Jan. 21, 2005 (EP) .................................... 05100384

(51) Int. Cl.
*G06K 9/00* (2006.01)
(52) U.S. Cl. ........... 382/128; 382/110; 128/922; 377/10
(58) Field of Classification Search ................ 382/110, 382/128; 128/922; 377/10; 356/2, 3, 9, 356/489, 495; 600/300
See application file for complete search history.

(56) References Cited

U.S. PATENT DOCUMENTS

| 4,817,187 | A | * | 3/1989 | Lien .............................. 382/253 |
| 5,079,699 | A | | 1/1992 | Tuy et al. |
| 5,671,157 | A | * | 9/1997 | Saito ............................. 345/419 |
| 5,761,157 | A | | 6/1998 | Takeda et al. |
| 7,783,093 | B2 | * | 8/2010 | Singh et al. .................... 382/128 |
| 2003/0223627 | A1 | | 12/2003 | Yoshida et al. |
| 2004/0105527 | A1 | | 6/2004 | Ferrant et al. |
| 2004/0175671 | A1 | * | 9/2004 | Jones et al. .................... 433/24 |

OTHER PUBLICATIONS

Coppini et al: "Recovery of the 3-D Shape of the Left Ventricle From Echocardiographic Images";IEEE Transactions on Medical Imaging, vol. 14, No. 2, Jun. 1995, pp. 301-317, XP000520942.
Wolf et al: "Automatic Segmentation and 3D-Registration of a Femoral Bone in MR Images of the Knee"; Pattern Recognition and Image Analysis, vol. 7, No. 1, pp. 152-165, Jan.-Mar. 1997.
Shechter et al: "Interactive Four Dimensional Segmentation of Multiple Image Sets"; Proceedings of the SPIE—The International Society for Optical Engineering, vol. 3976, 2000, pp. 165-173.

* cited by examiner

*Primary Examiner* — Samir Ahmed
*Assistant Examiner* — Ali Bayat

(57) ABSTRACT

A method of creating a segmentation of a volume of interest in an object data set is described, which object data set is formatted into object data slices, in which at least two object data slices each contain a contour line defining the portion of the volume of interest present in that object data slice as a region of interest. The method comprises the steps of calculating at least one surface which cuts through each of the at least two regions of interest, defining two curves on each surface which intersect with the contour lines, arranging for those curves to define the portion of the volume of interest present in the surface, calculating on each of the remaining object data slices a contour line which includes those points on the curves which intersect with that object data slice. A computer program and work station are also described.

8 Claims, 2 Drawing Sheets

VOLUME OF INTEREST SELECTION

The invention relates to a method of creating a segmentation of a volume of interest in an object data set, which object data set is formatted into object data slices, in which at least two object data slices each contain a contour line defining the portion of the volume of interest present in that object data slice as a region of interest.

Current methods for segmenting volumes of interest, for example organs of interest, tumors etc, include the manual drawing of contours on each slice. These contours can than be stacked to describe a VOI in three dimensions. However, with possibly 150-200 slices in an object data set this its time consuming, requires a lot of effort and will not result in a smooth three-dimensional shape. Another and more practical approach is to draw contours on only a limited number of 'key' slices and use some method to calculate the shape of contours in the slices in between, for instance shape based interpolation. U.S. Pat. No. 5,671,157 describes a method of segmenting a 3 dimensional structure within an object data set in which contours are prescribed on a limited number of slices and interpolation occurs between them. Drawing fewer contours and using shape interpolation in between helps, but may also introduce undesired contours, which means that the interpolated contours have to be checked and possibly corrected afterwards. This is again done slice by slice and is time consuming.

It is an object of the invention to produce a method of segmenting a volume of interest which is user friendly. This is achieved according to the invention whereby the method comprises the steps of calculating at least one surface which cuts through each of the at least two regions of interest, defining two curves on each of said surface which intersect with the contour lines, arranging for those curves to define the portion of the volume of interest present in said surface, calculating on the remaining object data slices a contour line which includes those points on the curves which intersect with that object data slice.

An object data set containing a volume of interest and formatted into a stack of slices can be examined on a slice by slice basis to identify the volume of interest. This can be done by eye, say, by a viewing radiographer, imaging technologist or clinician. To implement the invention, two slices, say, are chosen, which contain a portion of the volume of interest and a contour line drawn around those portions of interest which are visible in each slice. There will be one contour line per slice. These contour lines may be drawn by hand or may be produced automatically by software or other means suitable for the task. It is advantageous to chose object data slices towards or at either end of the volume of interest in the object data set, but this is not mandatory and in fact any object data slices showing portions of the volume of interest that are useful for showing its physical extent may be chosen.

Next, a surface is constructed which cuts through each region of interest contained in the contour lines already drawn. This provides a surface at a significantly different orientation from the orientation of the object data slices and therefore allows the image information to be presented in a new way. It is not necessary that the surface is at an orientation which is exactly orthogonal to the object data slices, but it is helpful if it is essentially orthogonal, because it is then that the viewer really sees the image information from a different perspective.

The image data, when presented in the surface, will show the portion of the volume of interest which is present in the surface. Two curves can then be constructed around this portion, which both intersect the contour lines in the object data slices. Because the orientation of the surface is essentially orthogonal to the object data slices, one object data slice will be situated at one level across the surface, the other object data slice being situated at another level. Therefore it is possible to produce, or otherwise calculate, curves which are one on each side of the portion of the volume of interest and connecting the image data points in the surface that are contributed to from each contour line.

The curves may be calculated or produced in any known way.

Next the curves are arranged or manipulated to bound, or otherwise contain at the edges of, the portion of the volume of interest that is shown in the surface. This may be done, for example, by arranging handles on the curves which allow it to be moved, or by automatically finding the edges of the portion of the volume of interest. This step may be performed manually.

Once the curves bound the portion of the volume of interest in the surface they now delimit a portion of the volume of interest in the whole object data set and can be used to delimit it. This information can be assigned to each image slice produced from the object data set to make or calculate, preferably automatically, a contour line in that image slice which defines the volume of interest in that slice.

The power of the invention can be clearly appreciated in this last step. For the transfer of the delimitation of the volume of interest from the surface to any object data slice within the object data set allows contour lines to be drawn automatically in any object data slice without further manual drawing, once initial contour lines have been defined in the initial object data slices. If only one surface is used the information delimited in that surface can be transferred to remaining object data slices in a simple way, for example by forming a series of circular contours, one on each object data slice, each deriving its diameter from the width between the two curves on the surface at the distance through the surface which contains the data representing that object data slice. However, as more surfaces are used greater volumetric detail can be transferred from the surfaces into the derived contours.

Thus the invention allows a volume of interest segmentation without the user being required to manually draw the contour line on every slice or on many slices. There is no succession of interpolation steps between the chosen slices and the curves constructed may be chosen to bound the portion of the volume of interest in the surface in any way suitable and therefore they may be curved. This therefore allows new contours to be produced which are no longer simply a linear interpolation between chosen slices. The results are a faster and more accurate segmentation and one that is therefore user friendly.

It has been found that a particularly advantageous implementation of the invention is as follows. When the initial object data slices have been chosen and the contour lines within them defined, a line is calculated which intersects each region of interest in the object data slices. In other words it intersects with the regions bounded by each contour line. A useful method for calculating this line is to calculate the center of gravity of at least two of the contour lines, a method which is known in the art, and construct the line by connecting up these calculated center of gravity points. The line should cut through each of the regions of interest as bounded by the already chosen contour lines. Once the line has been chosen a surface, or surfaces can be chosen which contains this line. This way a surface, or surfaces, which are essentially, or nearly, orthogonal to the object data slices can be easily constructed.

The line can be straight but can also itself be a curve in the instances in which the two slices are not parallel to each other. This can occur for example when the method is applied to segmentation of a twisting, tubular structure like the colon.

The surfaces are angularly arranged around the line and the angles between them may be identical or non-identical at each distance along the line, in other words they may be evenly angularly ranged or non-evenly angularly ranged.

It has been found to be particularly useful if several surfaces, evenly angularly ranged around the line, are constructed. So for example, four such surfaces arranged evenly around the line like a set of four paddle wheels can be constructed. Another useful embodiment, depending on the level of detail required in the resulting segmentation, is six surfaces.

The embodiment of evenly angularly ranged surfaces is useful when the segmentation method is applied to volumes of interest which have a smooth or a regularly varying edge or outer surface. The even arrangement of surfaces about the line provide a quick and simple way in which a volume of interest can be constructed.

An alternative useful embodiment may be produced if the angles between the surfaces are not required to be identical, or evenly arranged. In this case more surfaces can be produced in sections of the volume of interest where there is a greater variation in the volume edge, say where there is a variation in the radius of curvature of the edge as viewed in any plane.

A useful implementation of defining the curves involves the following steps. The intersection in each surface of the contour lines from the object data slices and the surface itself is designated a control point. The curves are then calculated to join up these control points. This can be done using Bezier curves, but other suitable mathematical solutions are possible. As previously explained, handles can be assigned to a curve to allow it to be manually manipulated, but a particularly advantageous way of achieving this is to arrange for the control points to be handles. It can also be arranged that as further control points are defined on a curve in a surface, for example to allow for a more detailed bounding of the volume of interest, they are used to calculate further contour lines in the object data slices which include those new control points. If required, an extra new control point on each new contour can be added, which intersects with the same surface but on the other side of the region of interest now contained within that new contour.

A particularly advantageous embodiment arises if the contours, as viewed in the object data slices, are used to assign new surfaces. For example, if a point on the edge of a contour is selected then a new surface may be constructed which includes that point. This may be advantageous when the user wishes to manually assign surfaces.

A further highly advantageous implantation of the invention involves the following steps. These control points are allowed to be moveable so that the user gains the ability to slide them over the surface as appropriate. The user can then use these control points to manipulate the curve so that it can be made to bound, or contain, or encompass, the portion of the volume of interest in the surface. It is also advantageous if extra control points can be added to the curves, as this allows the user to bend the curves around the volume of interest as viewed in the surface.

In practice, commonly chosen object data slices are one each towards or at either end of the volume of interest and one or two in the middle covering portions of the volume of interest where its physical dimensions within the slice are at a minima or maxima. However, other options are possible.

In many applications, the orientation of the acquired slices is chosen more or less perpendicular to the long axis of the structure that is imaged and which is to be the volume of interest. This is the case when for example the data is coronary magnetic resonance data, but also in general for 'potato' shaped structures and in particular for elongated structures. The orientation of the paddle wheel cross-sections is much more suitable then the orientation of the original slices for editing the boundaries of the volume of interest of such a structure because in the event of a 'potato' shaped or other elongated structure the structure can be more easily seen on these paddle wheel surfaces than on the original slices.

The few originally drawn contours are represented as smooth curves with a control point at the cross-section of the contour with each paddle wheel plane. Similarly, the contours in the paddle wheel planes are smooth curves with only a few control points at the cross-section of the curve and the plane of a drawn contour.

So it can be seen that the proposed method generates a smooth three-dimensional volume of interest from only a few manually drawn contours.

Various advantages ensue from the method of the invention. For example a segmentation can be performed from only a very limited number of contours drawn manually and therefore the proposed method provides a simple, fast, and user-friendly way of determining the three-dimensional shape of a volume of interest. A further advantage is that the resulting three-dimensional shape is guaranteed to be smooth and to remain smooth even after manual editing. The reason for this is that the shape in between the drawn contours is determined by smooth curves, which remain smooth after editing control points of these curves. A further advantage is that the interactive adaptation of the shape of the volume of interest to the shape of more or less elongated structures in the acquired data can be done more easily and more accurately in the planes of the paddle wheel than in the original slice planes. The application also relates to a computer program arranged to segment a volume of interest in an object data set, which object data set is formatted into object data slices, in which at least two object data slices each contain a contour line defining the portion of the volume of interest present in that object data slice as a region of interest, which computer program is arranged to calculate at least one surface which cuts through each of the at least two regions of interest, calculate two curves on each of said surface which intersect with the contour lines, arrange for those curves to define the portion of the volume of interest present in said surface, calculate on the remaining object data slices a contour line which includes those points on the curves which intersect with that object data slice.

A computer program so arranged has the advantage that it is suitable to carry out the method of the invention.

The application also relates to a work station arranged to segment a volume of interest in an object data set, which object data set is formatted into object data slices, in which at least two object data slices each contain a contour line defining the portion of the volume of interest present in that object data slice as a region of interest, which work station is arranged to calculate at least one surface which cuts through each of the at least two regions of interest, calculate two curves on each of said surface which intersect with the contour lines, arrange for those curves to define the portion of the volume of interest present in said surface, calculate on each of the remaining object data slices a contour line which includes those points on the curves which intersect with that object data slice.

A work station so arranged has the advantage that it is suitable to carry out the method of the invention.

These and other aspects of the invention will be described with reference to the following diagrams.

Figure 1:
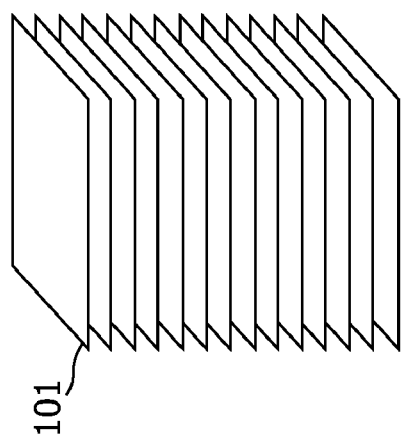
FIG. 1 shows an object data set formatted into a stack of object data slices.

FIG. 1 shows an object data set formatted into a stack of object data slices. The data in the object data set is allocated over the slices and each slice 101 contains enough data to produce an image. A volume of interest is contained in the object data set.

Figure 2:
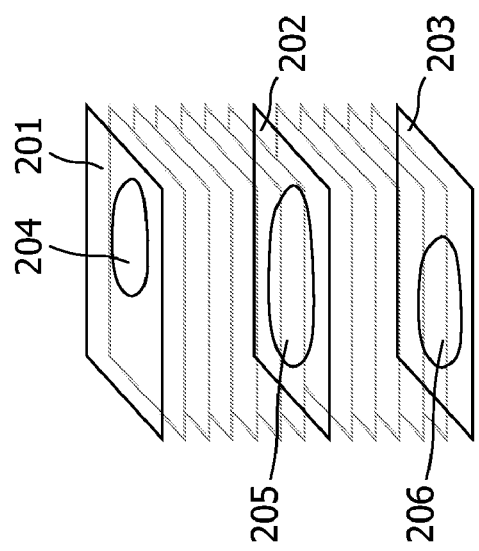
FIG. 2 shows the object data set with contour lines defined in three object data slices.

FIG. 2 shows the object data set with contour lines 204, 205 and 206 defined one each in three object data slices 201, 202 and 203. Each contour defines the portion of the volume of interest present in that object data slice as a region of interest.

Figure 3:
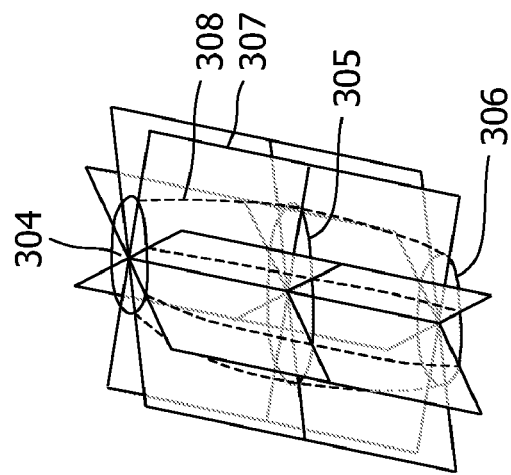
FIG. 3 shows a group of surfaces calculated within the object data set according to the invention.

FIG. 3 shows a group of surfaces, a representative one of which is surface 307, calculated within the object data set and intersecting with contour 304, which is within object data slice 301, not shown, and also intersecting with contour 305, which is within object data slice 302, not shown, and also intersecting with contour 306, which is within object data slice 303, not shown. A group of curves, a representative one of which is 308, are calculated in the surfaces and intersect with the contour lines as shown. There are two curves on each surface, one either side of the volume of interest which, since it is defined on selected object data slices by the contour lines, can be assumed to lie within, or thereabouts, the curves. Thus the curves in each surface perform the role of initial bounds to the intended segmentation of the volume of interest. The even distribution of the surfaces about the line, in the paddle wheel shape can clearly be seen.

Figure 4:
FIG. 4 shows an example of an image slice in a coronary magnetic resonance scan, for which type of scan the invention provides a suitable segmentation method.

FIG. 4 shows an example of an image slice in a coronary magnetic resonance scan, for which type of scan the invention provides a suitable segmentation method.

Figure 5:
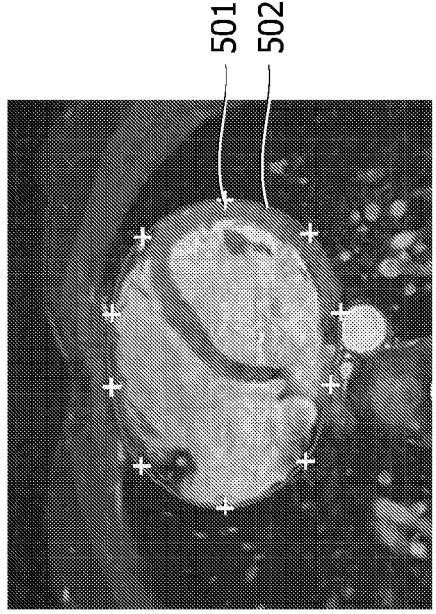
FIG. 5 shows an interactively drawn contour in accordance with the invention, on the coronary magnetic resonance image of FIG. 4.

FIG. 5 shows a step from the method of the invention as applied to the coronary magnetic resonance scan of FIG. 4. A contour 502 is shown with control points, a representative one of which is 501.

Figure 6:
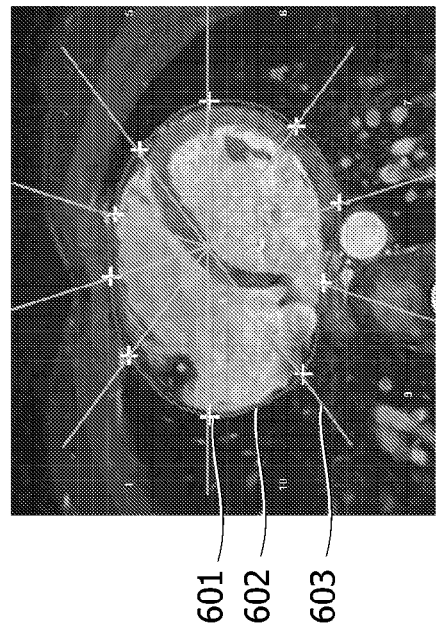
FIG. 6 shows the coronary magnetic resonance image of FIG. 4, now with contour, control points and cross section of surfaces, according to the invention.

FIG. 6 shows the coronary magnetic resonance image of FIG. 4, with contour the contour line 602, control points, a representative one of which is 601, and cross sections of surfaces, a representative one of which is 603. Again, the paddle wheel shape of the distribution of the surfaces is clearly seen.

Figure 7:
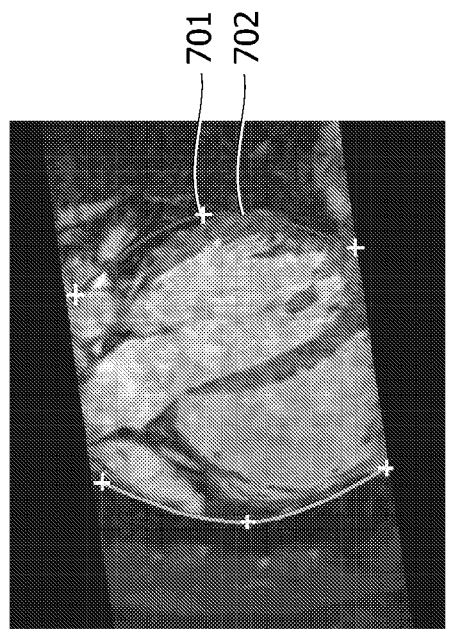
FIG. 7 shows the data in the object data set reformatted to show the image information in the surface, according to the invention.

FIG. 7 shows the data in the object data set reformatted to show the image information in one of the surfaces. The curves in the surface are visible, a representative one of which is 702. The control points on the curve are visible, for example 701. As can be seen, the curves in the surfaces are genuinely curved and therefore allow the volume of interest to be bounded by a curved boundary shape.

The proposed method was implemented in a prototype application for visualization of coronary arteries and heart from magnetic resonance data. A volume of interest containing the heart and coronaries should be isolated from the surrounding tissues to allow visualization of the coronaries by volume rendering, as is known in the art. Automatic segmentation of this volume of interest is not possible because the volume of interest cannot be distinguished from its surroundings based on voxel values and its boundary is not characterized by a clear image feature. Thus, for example, segmentation by thresholding, or thresholding in combination with region growing, both of which are known in the art, is not appropriate. Manual delimitation of the volume of interest is possible but difficult and time consuming. The user has to rely on different techniques for reducing the multi-dimensional, usually three-dimensional, space to two dimensions, determining multiple two-dimensional contour lines in these more limited two-dimensional representations, often determining these contour lines by hand, and then reconstructing again a multi-dimensional volume of interest from the entirety of these two-dimensional slices with their contour lines. The reliance on hand drawing of each contour line introduces error, particularly if that action is performed repetitively over a period of time. The invention therefore provided a significantly easier and more user friendly way to perform the segmentation.

FIG. 4 shows an example of one of the original slice images of such a dataset. The volume of interest, which is to be defined, should include all tissues within the complete heart area. The boundaries of the volume of interest should be just outside the coronary arteries. These vessels have local directions that may be more or less perpendicular to the slice planes, making it difficult to delineate the volume of interest boundaries as a stack of contours in a slice-by-slice approach. Thus again it can be seen, the method of the invention offers an opportunity to more easily perform the segmentation.

For the proposed method as implemented, only a few very global contours were drawn. FIG. 5 shows such a contour. A minimum of two such contours is required. The axis of the paddle wheel is defined as the line connecting the centers of gravity of the first and last, in this case top and bottom, drawn contour. A user-defined number of paddles is defined through the paddle wheel axis, distributed at equal angular increments. Again this is shown in FIG. 6. The cross-sections of the drawn contours with the paddle wheel planes provide the control points for the automatically generated smooth curves that describe the volume of interest boundary in the paddle wheel planes, as shown in FIG. 7. The cross-section of these curves with the slice planes provides the control points for the automatically generated smooth curves that describe the volume of interest boundary in the original slice planes, or object data slices. The result is a smooth three-dimensional volume of interest shape that can easily be modified by interactive modification of any of the involved curves, advantageously achieved using the control points. Adaptation of one curve leads to automatic update of all other curves. Addition or deletion of control points was included in the interaction.

The invention claimed is:

1. A method of creating a segmentation of a volume of interest in an object data set derived from a Magnetic Resonance machine, which object data set is formatted into object data slices, in which at least two object data slices each contain a contour line defining a portion of the volume of interest present in the object data slices as a region of interest, characterized in that, the method comprises the steps of:

calculating at least one surface which cuts through each of the at least two regions of interest, defining two curves on each of said surface which intersect with the contour lines, arranging for those curves to define the portion of the volume of interest present in said surface, calculating on the remaining object data slices a contour line which includes those points on the curves which intersect with the object data slices.

2. A method of creating a segmentation of a volume of interest in an object data set as claimed in claim 1, characterized in that the method of calculating the at least one surface comprises the steps of:

calculating a line which intersects with each region of interest in the object data slices, calculating the at least one surface in such a way that each such surface contains that line.

3. A method of creating a segmentation of a volume of interest in an object data set as claimed in claim 2, characterized in that the method of defining the two curves on each surface which intersect with the contour lines comprises the steps of:

assigning control points at the intersection of the contour lines with each said surface, defining each curve as a curve which intersects the control points on one side of the line in each of said surfaces.

4. A method of creating a segmentation of a volume of interest in an object data set as claimed in claim 2, characterized in that the method of calculating the line comprises the steps of:

calculating the center of gravity of at least two of the contour lines in the object data slices, calculating the line in such a way that it connects up each calculated center of gravity.

5. A method of creating a segmentation of a volume of interest in an object data set as claimed in claim 2, in which further there is more than one surface which cuts through each of the at least two regions of interest, and these surfaces are calculated to be angularly ranged in an evenly spaced manner around the line.

6. A method of creating a segmentation of a volume of interest in an object data set as claimed in claim 1 characterized in that there is an adjustable number of surfaces.

7. A computer program stored on a non-transitory computer readable medium and arranged to segment a volume of interest in an object data set, which object data set is formatted into object data slices, in which at least two object data slices each contain a contour line defining a portion of the volume of interest present in the object data slices as a region of interest, characterized in that, the computer program is arranged to:

calculate at least one surface which cuts through each of the at least two regions of interest, calculate two curves on each of said surface which intersect with the contour lines, arrange for those curves to define the portion of the volume of interest present in said surface, calculate on the remaining object data slices a contour line which includes those points on the curves which intersect with the object data slices.

8. A work station having a processor and arranged to segment a volume of interest in an object data set, which object data set is formatted into object data slices, in which at least two object data slices each contain a contour line defining the portion of a volume of interest present in the object data slices as a region of interest, characterized in that, the work station is arranged to:

calculate at least one surface which cuts through each of the at least two regions of interest, calculate two curves on each of said surface which intersect with the contour lines, arrange for those curves to define the portion of the volume of interest present in said surface, calculate on the remaining object data slices a contour line which includes those points on the curves which intersect with the object data slices.

\* \* \* \* \*